US011183092B2

(12) United States Patent
Kwon

(10) Patent No.: US 11,183,092 B2
(45) Date of Patent: Nov. 23, 2021

(54) CAPACITANCE-TYPE TOUCH PANEL DEVICE AND OPERATION METHOD FOR SAME

(71) Applicant: Industry-University Cooperation Foundation Hanyang University, Seoul (KR)

(72) Inventor: Oh-Kyong Kwon, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 137 days.

(21) Appl. No.: 15/324,570

(22) PCT Filed: Jul. 7, 2015

(86) PCT No.: PCT/KR2015/006997
§ 371 (c)(1),
(2) Date: Jan. 6, 2017

(87) PCT Pub. No.: WO2016/006910
PCT Pub. Date: Jan. 14, 2016

(65) Prior Publication Data
US 2018/0181229 A1 Jun. 28, 2018

(30) Foreign Application Priority Data
Jul. 8, 2014 (KR) .................. 10-2014-0085411

(51) Int. Cl.
*G09G 3/20* (2006.01)
*G06F 3/041* (2006.01)
*G06F 3/044* (2006.01)

(52) U.S. Cl.
CPC ............... *G09G 3/20* (2013.01); *G06F 3/044* (2013.01); *G06F 3/0418* (2013.01);
(Continued)

(58) Field of Classification Search
CPC .......... G06F 3/044; G06F 3/0418; G06F 3/20
See application file for complete search history.

(56) References Cited

U.S. PATENT DOCUMENTS

2007/0109274 A1* 5/2007 Reynolds ................ G06F 3/041
345/173
2011/0063229 A1* 3/2011 Krah ..................... G06F 3/0418
345/173
(Continued)

FOREIGN PATENT DOCUMENTS

JP 2013-114326 A 6/2013
KR 10-2013-0056083 A 5/2013
KR 10-2014-0072804 A 6/2014

OTHER PUBLICATIONS

International Search Report for PCT/KR2015/006997 dated Oct. 15, 2015.

Primary Examiner — Michael A Faragalla
(74) Attorney, Agent, or Firm — Sughrue Mion, PLLC

(57) ABSTRACT

Disclosed are a capacitance-type touch panel device and an operation method for the same. In order that the effect of disturbance noise comprised in a receiving signal is minimized, a calculation for a digital code which has been converted into a digital signal type is performed. Information about the noise level of the digital code is compared to a reference value, and, when the frequency of the noise is determined to be similar to the frequency of the receiving signal, the frequency of an operation signal, which is supplied from a signal generation unit, is changed.

13 Claims, 14 Drawing Sheets

(52) U.S. Cl.
CPC .................... *G06F 3/04166* (2019.05); *G06F 2203/04108* (2013.01); *G09G 2310/0291* (2013.01); *G09G 2354/00* (2013.01)

(56) References Cited

U.S. PATENT DOCUMENTS

| | | | |
|---|---|---|---|
| 2011/0063993 A1* | 3/2011 | Wilson | G06F 3/044 370/254 |
| 2012/0306801 A1* | 12/2012 | Rai | G06F 3/044 345/174 |
| 2013/0127773 A1 | 5/2013 | Kwon et al. | |
| 2014/0085246 A1* | 3/2014 | Shahparnia | G06F 3/044 345/174 |
| 2014/0152617 A1* | 6/2014 | Kida | G06F 3/044 345/174 |

* cited by examiner

[FIG. 1]
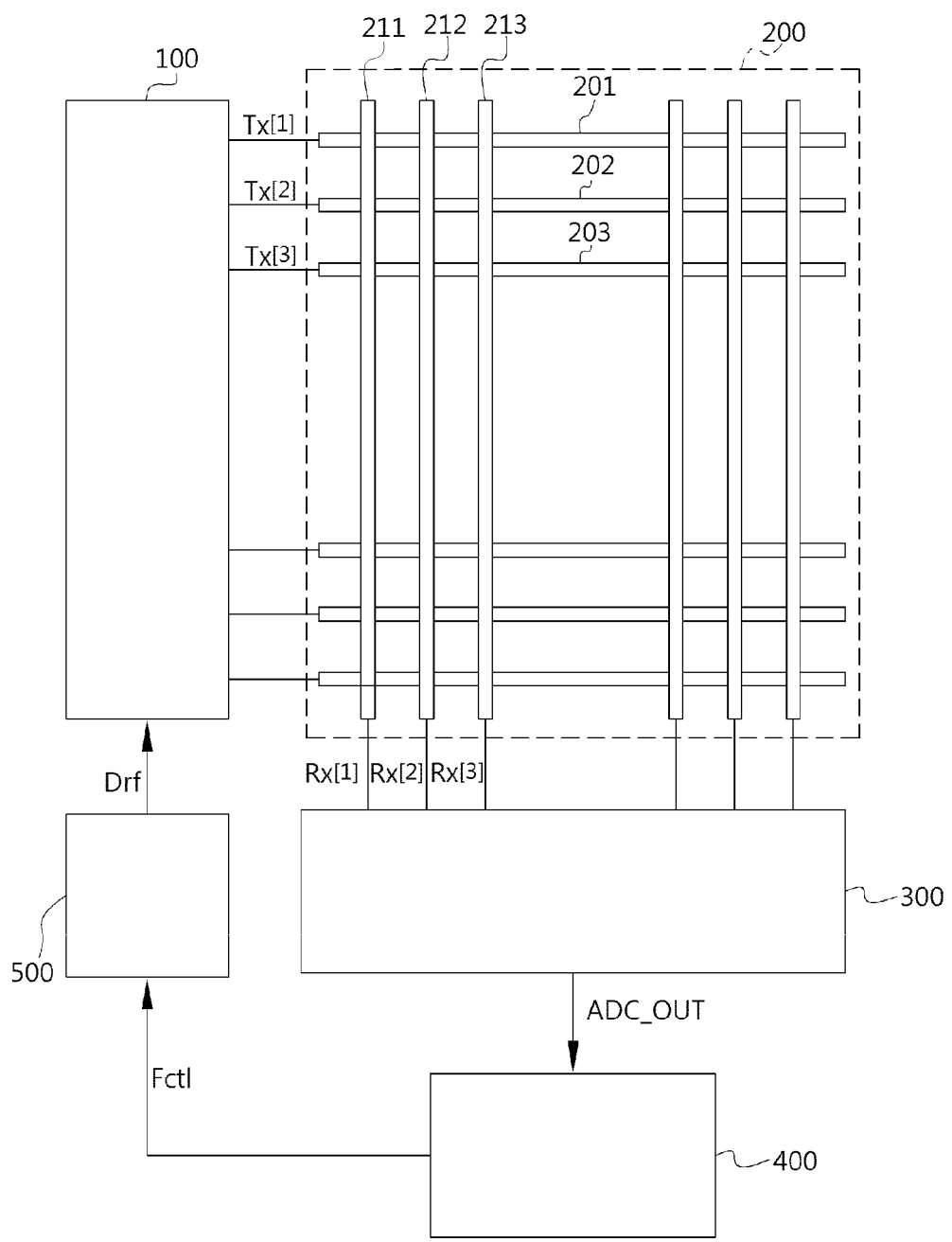

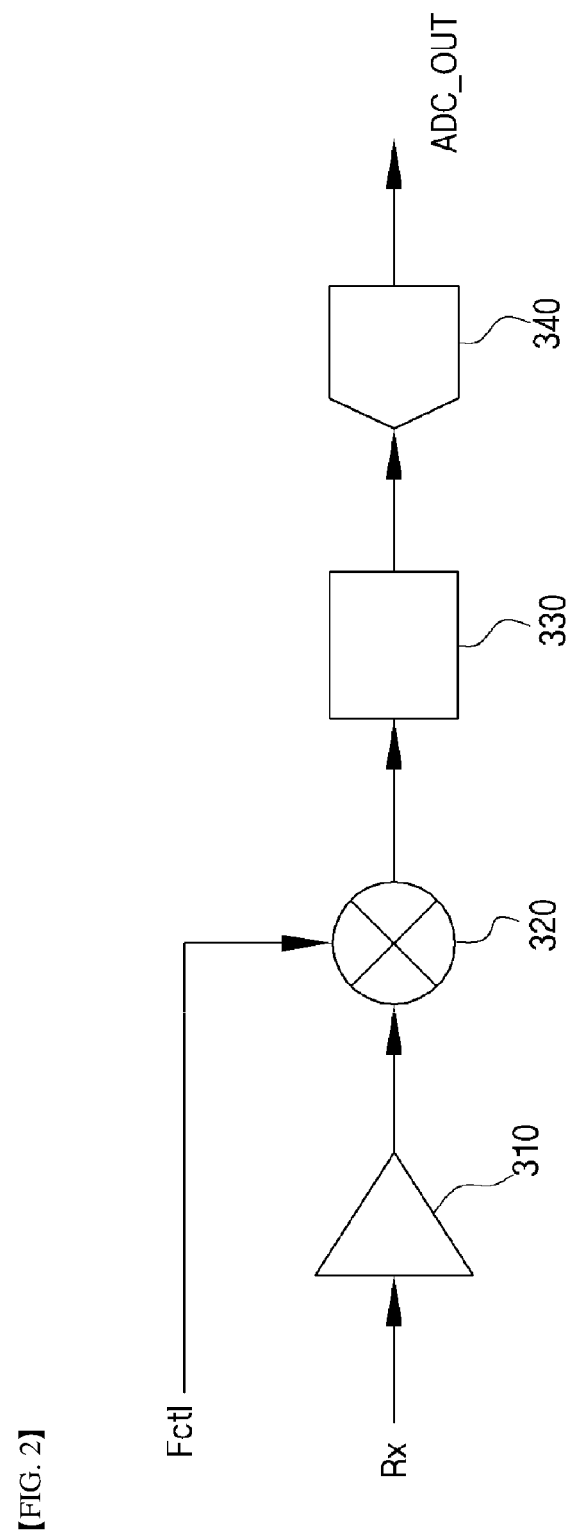
[FIG. 2]

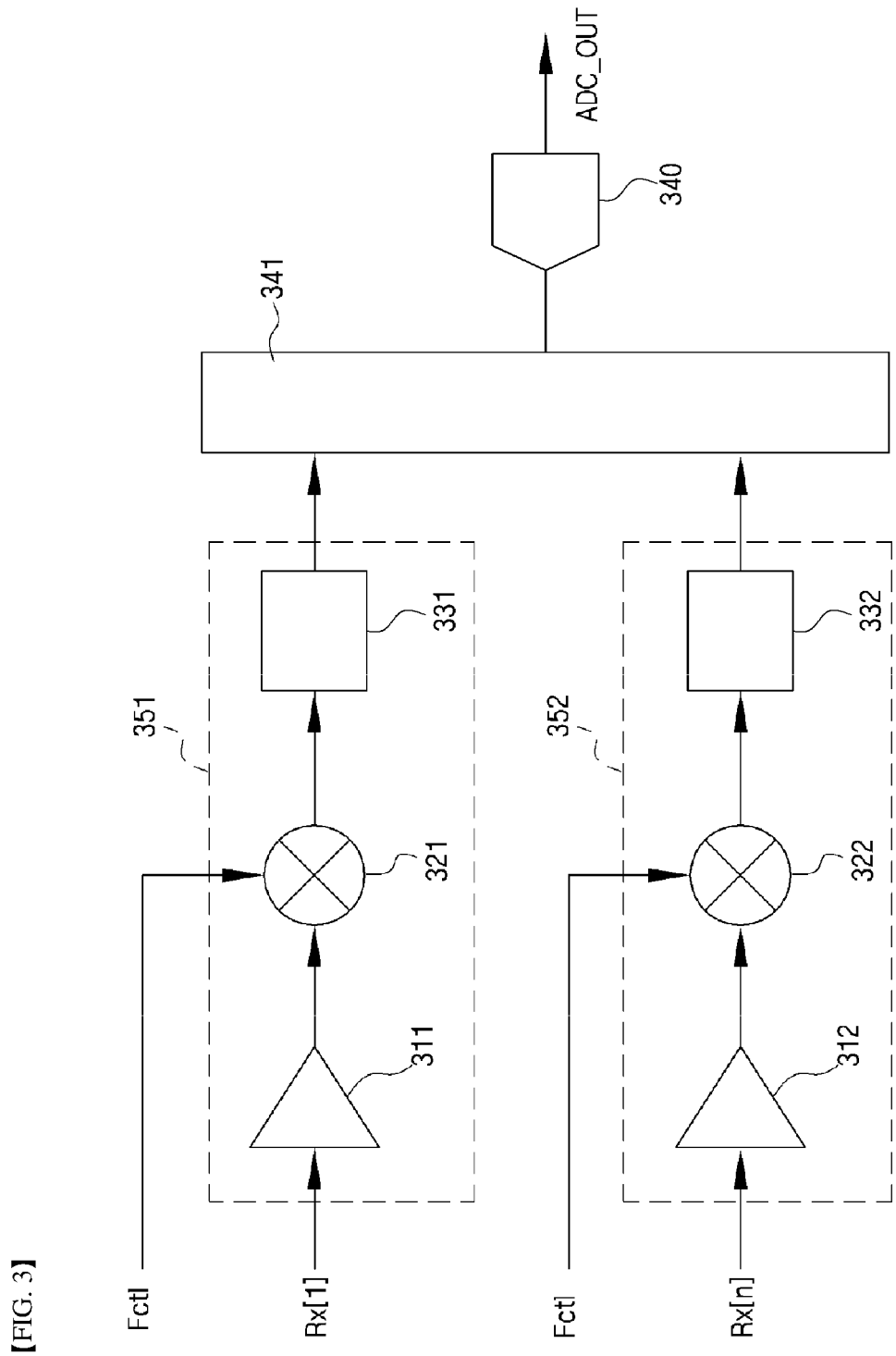
[FIG. 3]

[FIG. 4]
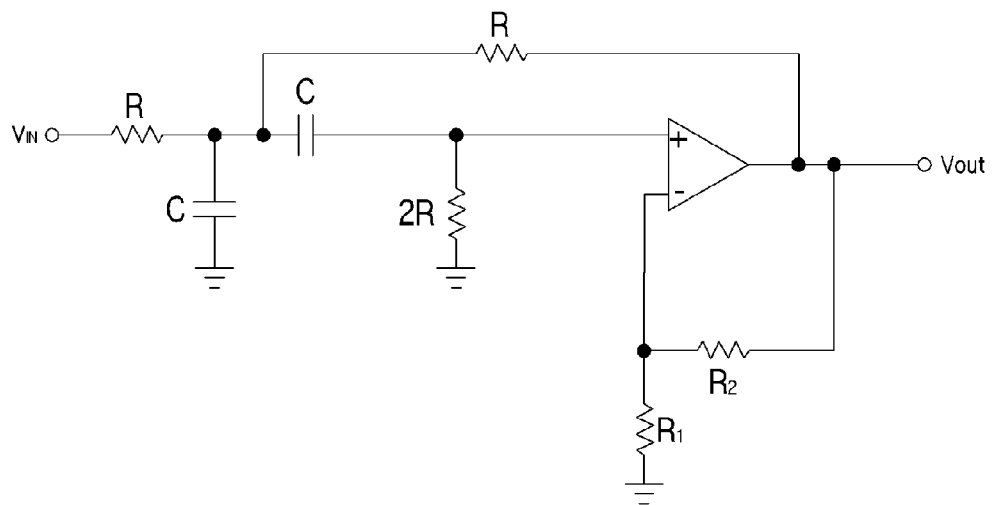
[FIG. 5]
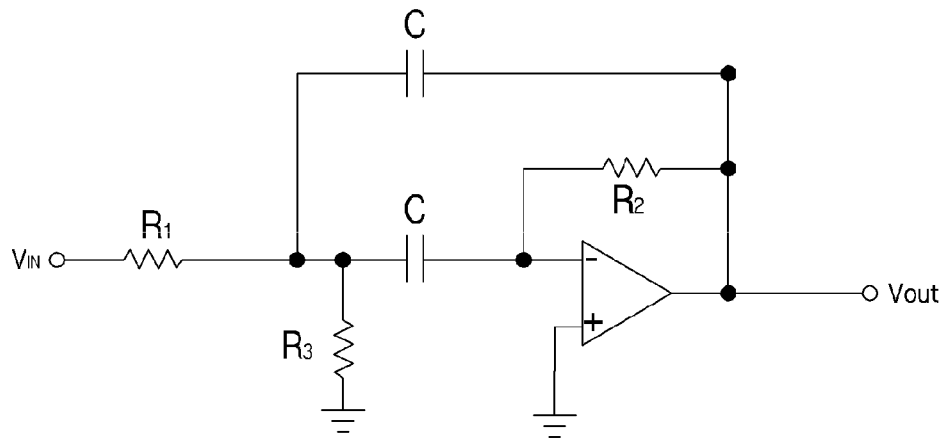

[FIG. 6]
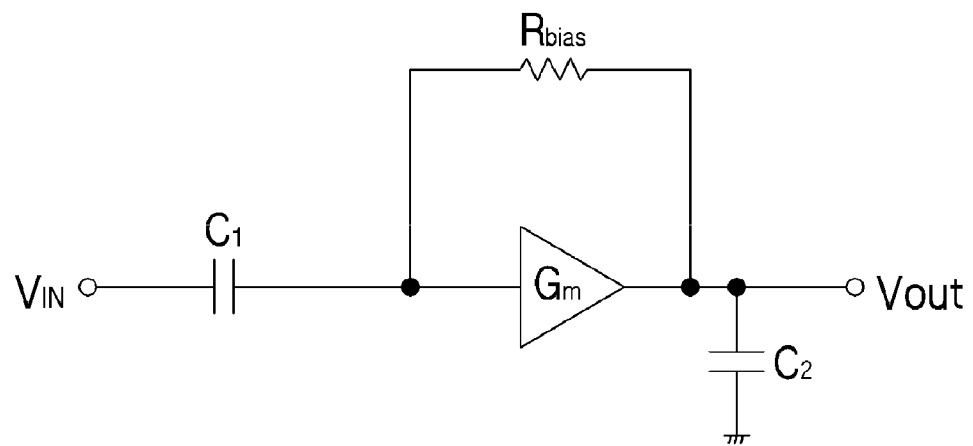
[FIG. 7]
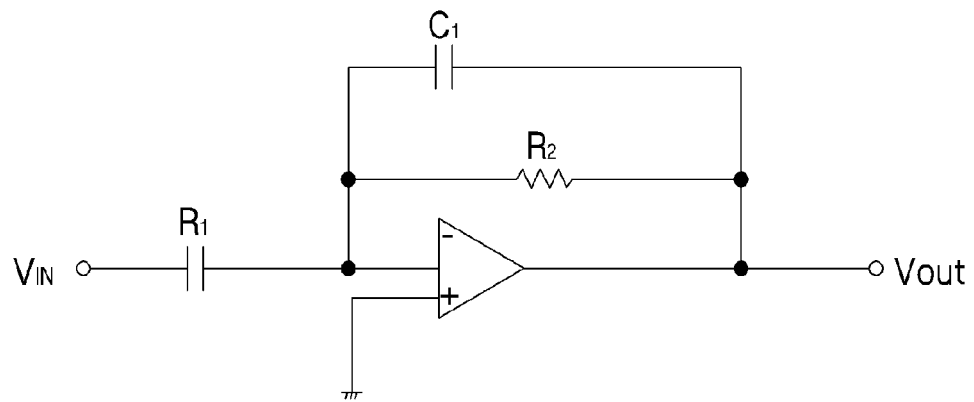

[FIG. 8]
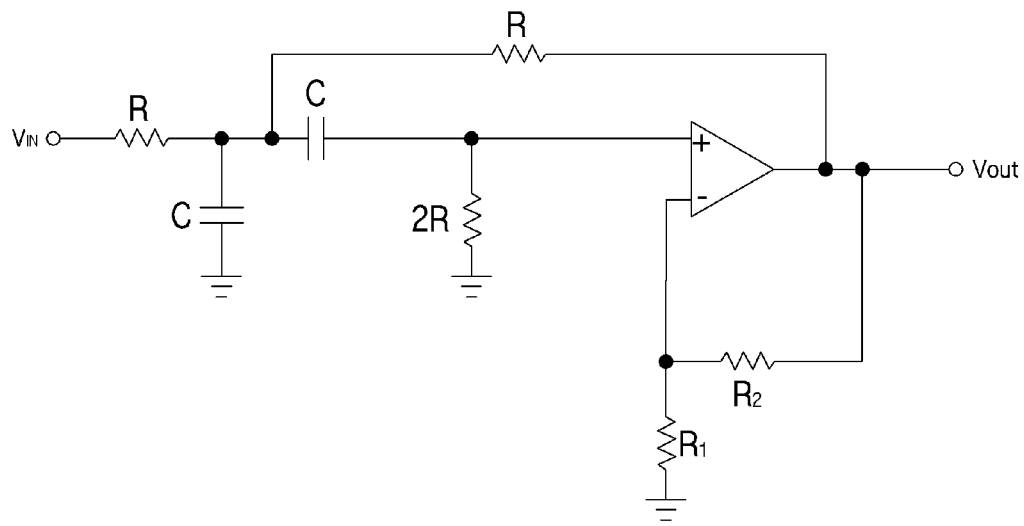
[FIG. 9]
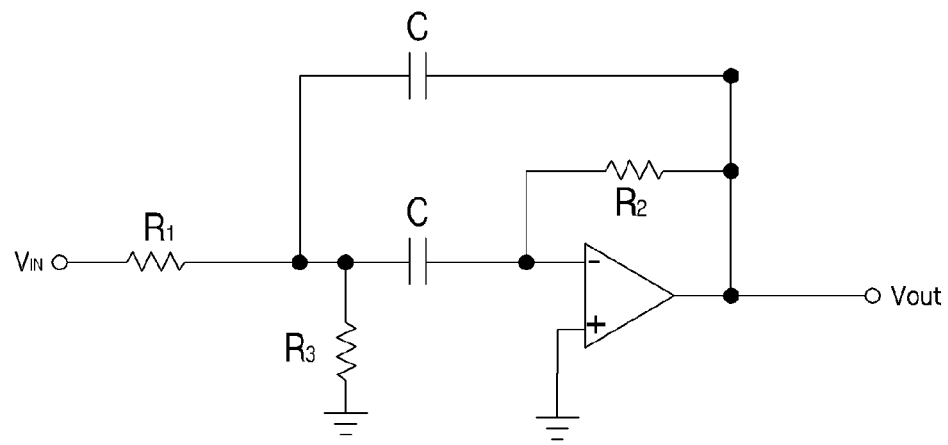

[FIG. 10]
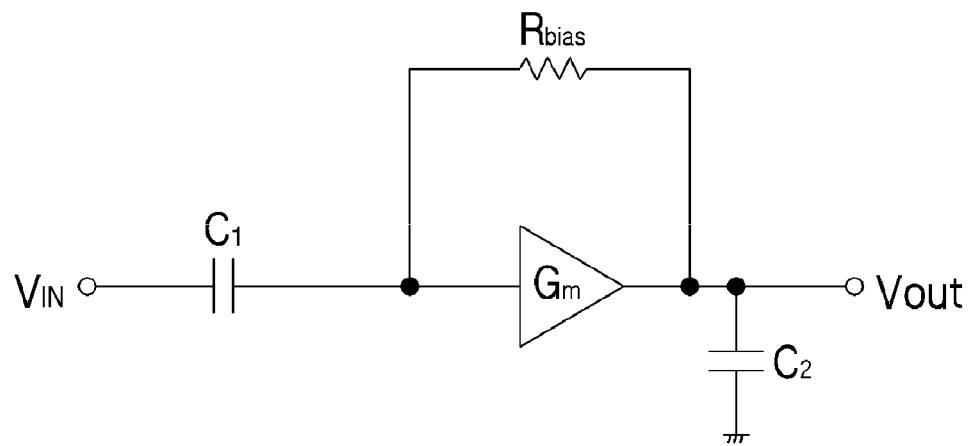
[FIG. 11]
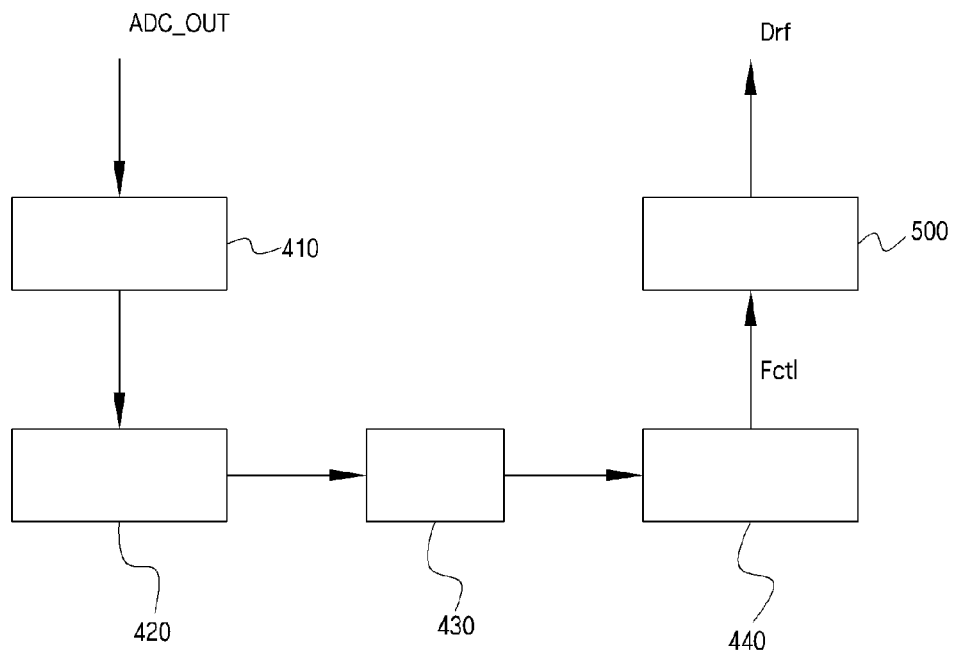

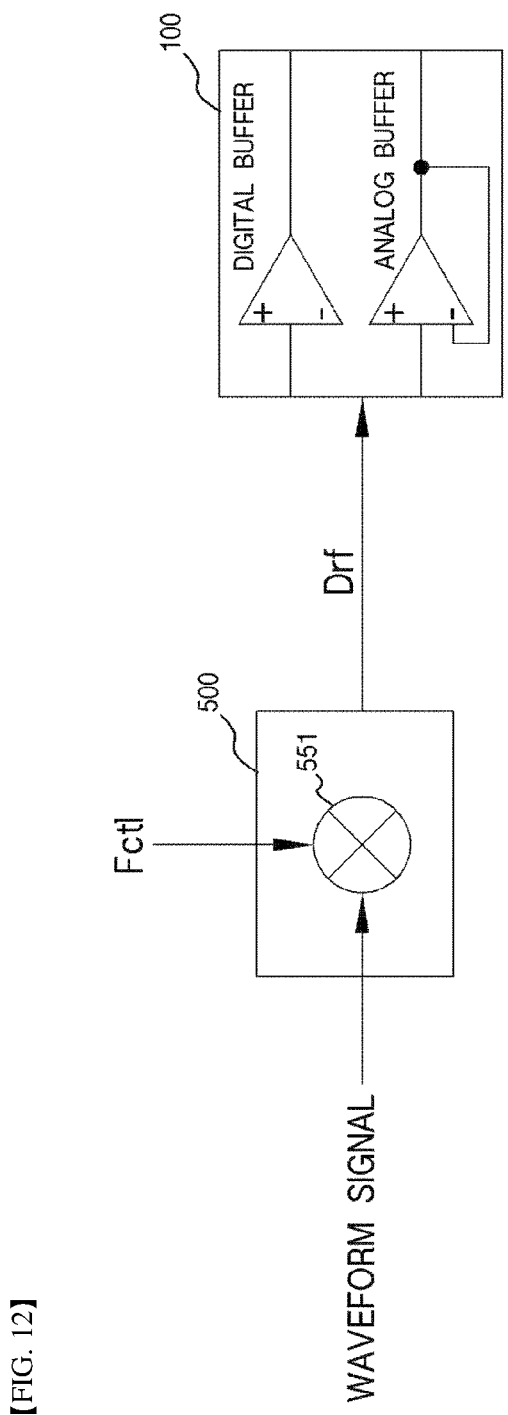
[FIG. 12]

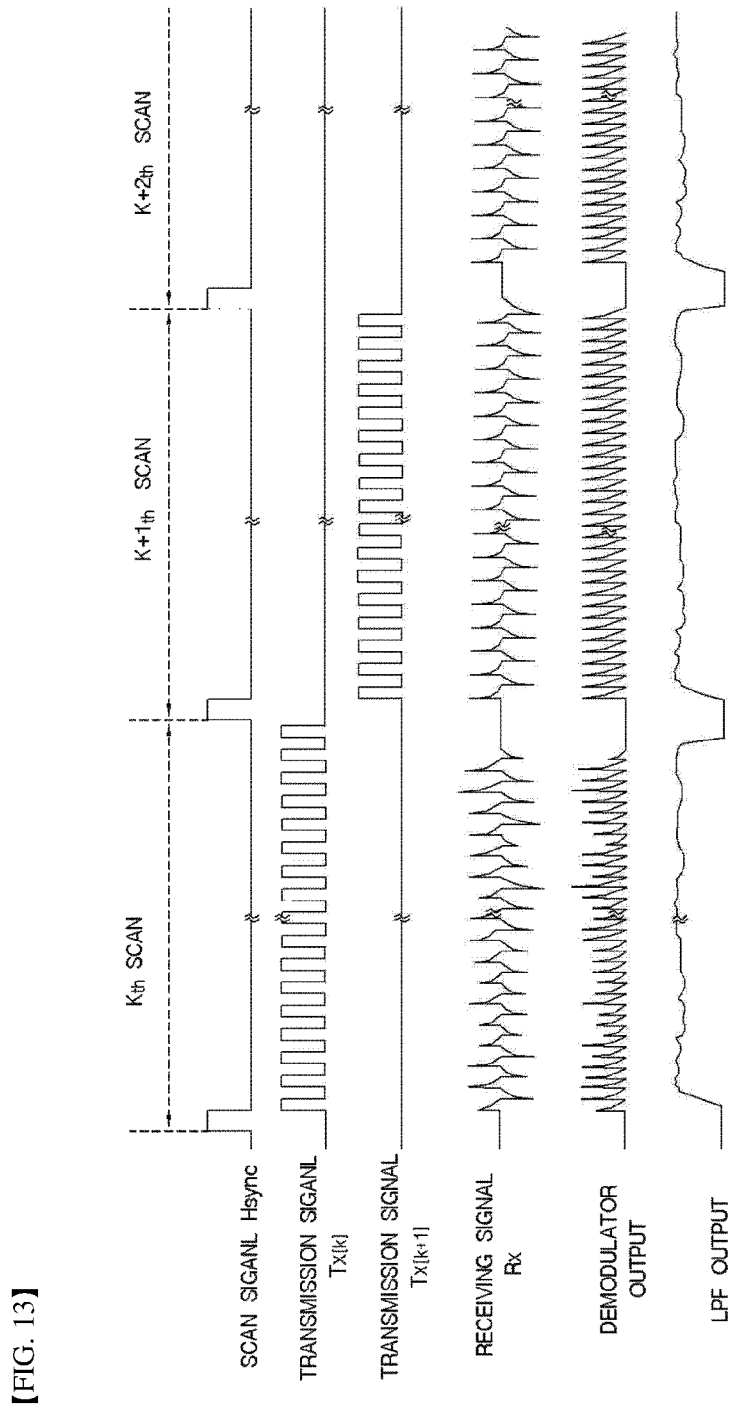
[FIG. 13]

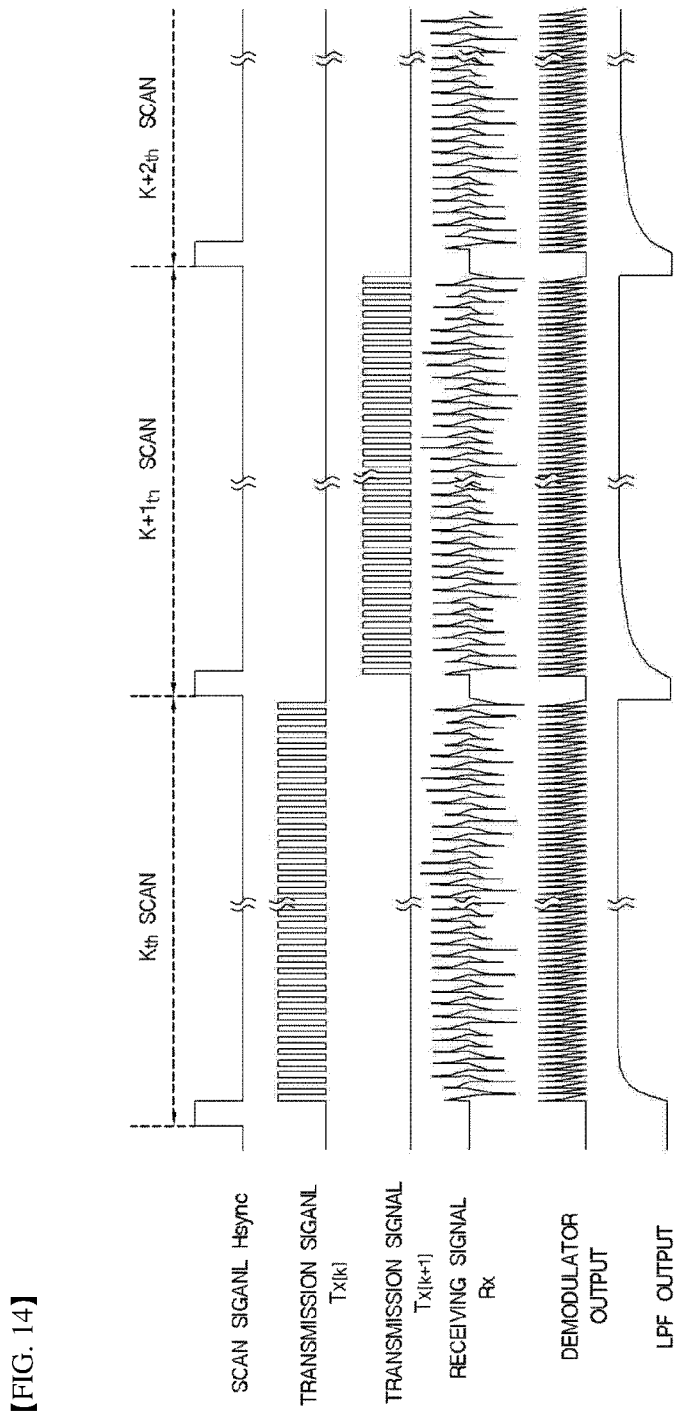
[FIG. 14]

[FIG. 15]
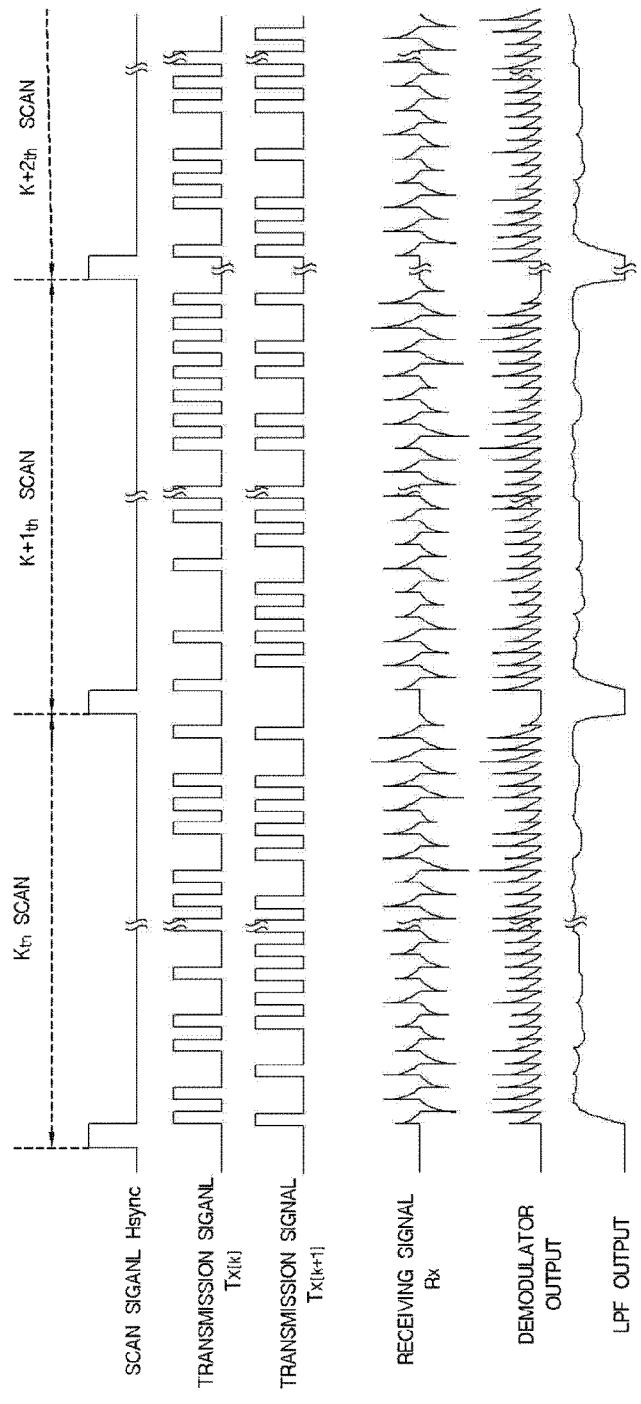

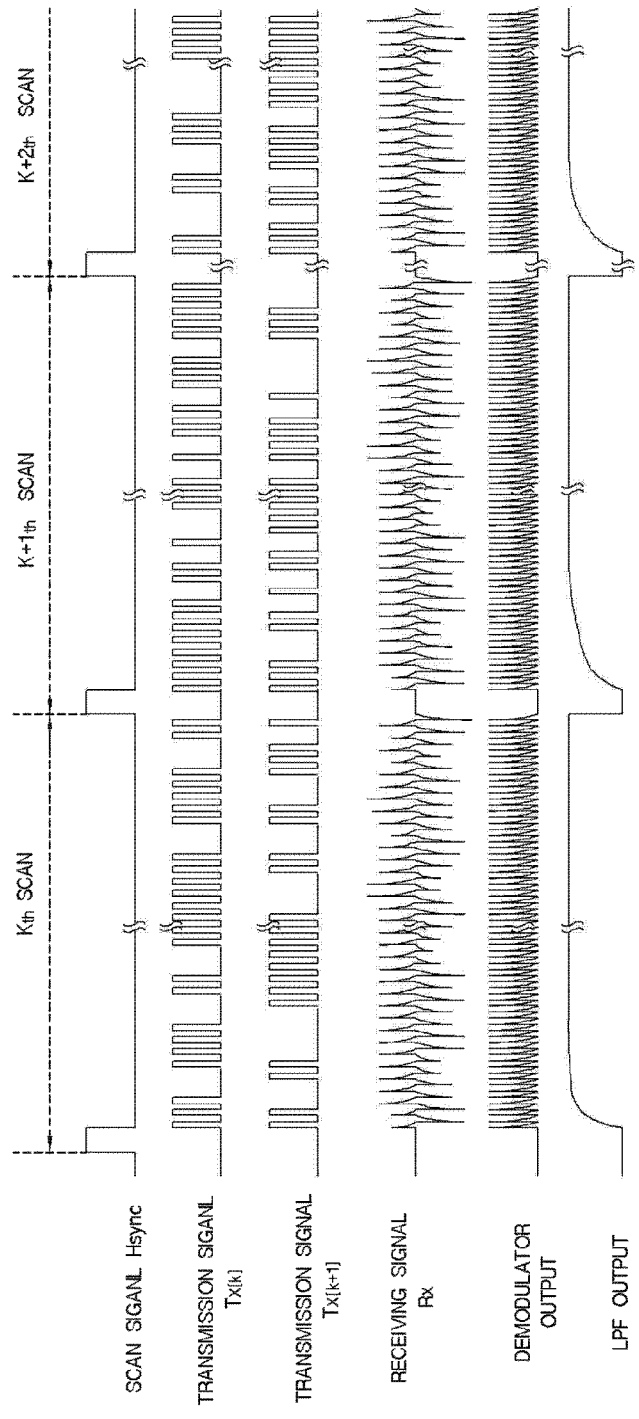
[FIG. 16]

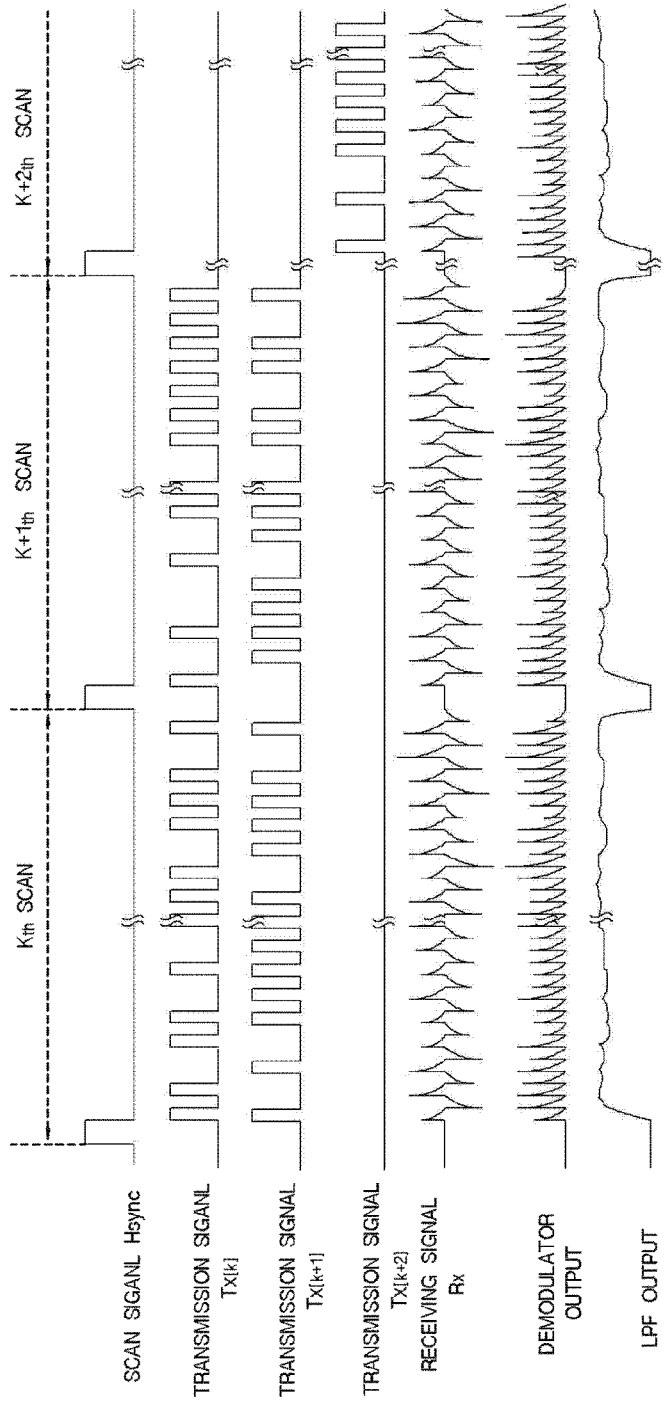
[FIG. 17]

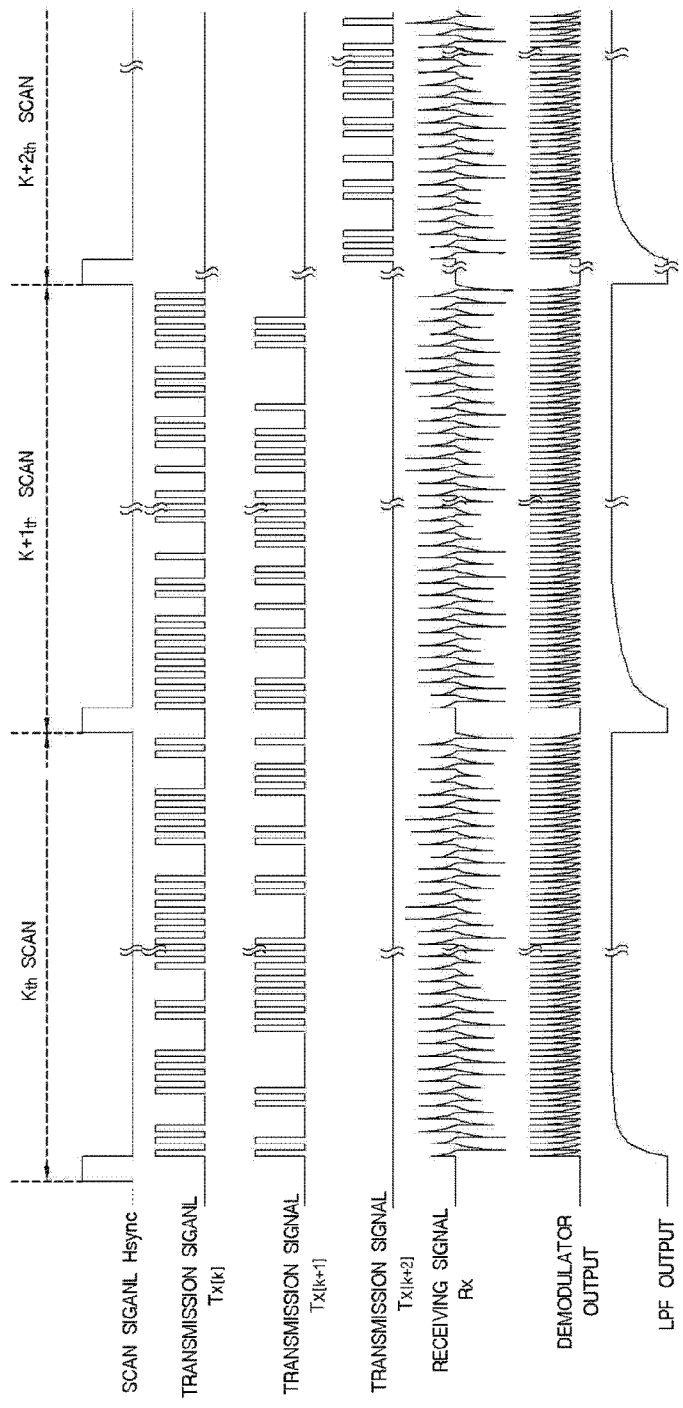

CAPACITANCE-TYPE TOUCH PANEL DEVICE AND OPERATION METHOD FOR SAME

TECHNICAL FIELD

The present invention relates to a capacitance-type touch panel and an operation method for the same and, more particularly, to a capacitance-type touch panel device and an operation method for the same capable of removing noise effects by selecting an optimum frequency during determining whether a touch action has occurred.

BACKGROUND ART

A touch panel is touch sensitive device attached to a display device, etc. that generates a signal depending on whether a touch action by a user has occurred. In particular, a touch panel is frequently used in a smartphone, a personal digital assistant (PDA), or a navigation device. A touch panel may be classified into the resistance-type and the capacitance-type. The capacitance-type, having advantages of a simple structure and low power consumption, is mainly used in portable electronics.

A capacitance-type touch panel is configured with a transmission electrode, a receiving electrode, and an interposing dielectric. The transmission electrode and receiving electrode are arranged in a cross bar configuration, and the capacitor characteristic is established by the transmission electrode, the receiving electrode, and the dielectric. When a touch action by a user occurs, capacitance changes, and the changed capacitance is detected through a change in the voltage appearing between the transmission electrode and the receiving electrode. Typically, a transmission signal having square wave is delivered through a transmission electrode, and a receiving signal is detected through a receiving electrode.

A noise component may be introduced to the capacitance-type touch panel, due to fluorescent lamps or AC power sources. That is, when a user generates a touch action, the user acts as an antenna, and noise is delivered to the touch panel, causing malfunctions in the touch panel.

In the Korean patent publication 2012-0111910, a touch panel device capable of reducing disturbance noise is disclosed. In the patent, output from an A/C converter circuit is received by a subtract circuit. Due to the action of the subtract circuit, each noise component is mutually cancelled. Through this, a noise component may be removed. On the other hand, the patent absolutely requires controlling sampling time for performing the noise cancelling. That is, sampling is performed at the rising edge or the falling edge of the waveform of a signal delivered from a receiving electrode. However, when a touch action by a user occurs, there is a characteristic delay of a receiving signal by a specific duration with respect to a transmission signal because of capacitance other than the existing capacitance generated due to the user. Accordingly, the delay is not uniform because of the varying touching gestures, and, therefore, there is a disadvantage in which it is difficult to apply an exact sampling time to a receiving signal.

Also, in the Korean patent 1350673, a technology is disclosed in which an analysis of noise characteristics is used to adjust a transmission signal. In the patent, characteristics of noise components in signals stored in a plurality of capacitors are determined using an integrator. Through this, frequency of a transmission signal is adjusted. Also, the patent discloses only the configurations that generate a transmission signal having a frequency different from the conventional frequencies through the analysis of noise characteristics. In particular, the patent discloses no technology regarding selecting an optimum frequency.

As described above, the conventional technologies try to minimize the effects of disturbance noise generated when a user generates a touch action. To minimize the disturbance noise, noise included in a receiving signal is eliminated or the noise effect can be minimized by changing frequency. However, the above described conventional technologies are not able to propose an optimum method for eliminating noise components and thus has a persistent technical disadvantage.

DISCLOSURE OF INVENTION

Technical Problem

The present invention is directed to providing a touch panel device and an operational method for the same in which effects of disturbance noise can be minimized.

Technical Solution

The present invention for achieving the technical objectives provides a touch panel device including a driver for generating a transmission signal for detecting a touch action; a touch sensor having transmission electrodes and receiving electrodes that mutually cross and forming a receiving signal according to the touch action; a receiving processor for being input with the receiving signal and amplifying the input receiving signal for conversion into a digital code; an optimum frequency generator for being input with the digital code from the receiving processor, deducing information regarding noise level of the digital code and discriminating a noise component having a frequency close to the frequency of the receiving signal, and generating a frequency control signal according to the discrimination result; and a signal generator for performing a frequency change operation according to the frequency control signal to generate a driving signal at the changed frequency to induce a frequency change for the transmission signal.

The objective of the present invention is achieved by providing a method including being input with a receiving signal having a first frequency and including touch information; processing the receiving signal and forming a digital code through digital conversion; generating a frequency control signal by determining whether the frequency of the noise component included in the receiving signal is close to the frequency of the receiving signal by a calculation of the digital code; generating a driving signal having a second frequency that is different from the first frequency according to the frequency control signal; and forming a transmission signal having the second frequency using a driving signal having the second frequency.

Advantageous Effects

According to the present invention described, when a frequency of disturbance noise is close to the frequency of a transmission signal or a receiving signal, the amplitude of the receiving signal is increased and analyzed by an optimum wavelength generator through a calculation of a digital code. Also, the analyzed result is compared with a reference value, and the frequency of a driving signal supplied to a driver is changed. Such change in the frequency of the driving signal continues until a result of a calculation of a digital code is lower than a specific ratio relative to a reference value. Through this, a transmission signal having a frequency that is different from the frequency of the noise is supplied to the touch sensor, and the effect due to disturbance noise is minimized.

Because the driving signal is not supplied in a constant manner and changes according to the application of noise, reduction of touch signal sensitivity due to the effects of noise or malfunctions are prevented. Also, accuracy for a touch action is improved.

BRIEF DESCRIPTION OF DRAWINGS

FIG. 1 is a block diagram of a touch panel device according to an exemplary embodiment of the present invention.

FIG. 2 is a block diagram for explaining operation of a receiving processor according to an exemplary embodiment of the present invention.

FIG. 3 is a different block diagram for explaining operation of a receiving processor according to an exemplary embodiment of the present invention.

FIGS. 4 to 6 are circuit diagrams illustrating the band pass filter explained in FIGS. 2 and 3 according to an exemplary embodiment of the present invention.

FIGS. 7 to 10 are circuit diagrams illustrating the low pass filter shown in FIGS. 2 and 3 according to an exemplary embodiment of the present invention.

FIG. 11 is a block diagram for explaining operation of optimum frequency generator according to an exemplary embodiment of the present invention.

FIG. 12 is a block diagram illustrating the signal generator and the driver shown in FIG. 11 according to an exemplary embodiment of the present invention.

FIGS. 13 and 14 are timing diagrams for explaining operation of a touch panel device according to an exemplary embodiment of the present invention.

FIGS. 15 and 16 are different timing diagrams for explaining operation of a touch panel device according to an exemplary embodiment of the present invention.

FIGS. 17 and 18 are still different timing diagrams for explaining operation of a touch panel device according to an exemplary embodiment of the present invention.

MODE OF INVENTION

While the present invention can be modified in various ways and implemented in many forms, specific embodiments are described in the drawings and explained in detail. However, there is no intent to limit the present invention to the specific disclosure, and it should be understood that the present invention includes all modifications, equivalents, and alternatives included in the idea and technical scope thereof. In describing each of the drawings, like reference numerals are used to denote like elements.

Unless otherwise defined, all terms including technical and scientific terms used herein each have the same meaning generally understood by those of ordinary knowledge in the art to which the present invention belongs. Generally used terms, such as terms defined in dictionaries, should each be interpreted by a meaning consistent with the context of related technologies and should not be interpreted by an ideal or excessively formal meaning unless clearly defined so in the present invention.

Hereinafter, exemplary embodiments of the present invention will be described in further detail with references to accompanying drawings.

Embodiment

FIG. 1 is a block diagram of a touch panel device according to an exemplary embodiment of the present invention.

Referring to FIG. 1, the touch panel device includes a driver 100, touch sensor 200, a receiving processor 300, an optimum frequency generator 400, and a signal generator 500.

The driver 100 receives a driving signal Drf applied from the signal generator 500 and generates a transmission signal Tx in a pulse wave form, a square wave form, or a saw tooth wave form. For sending the transmission signal Tx, the driver 100 has a driver for each of the transmission electrodes 201, 202, 203. That is, the driving signal Drf may have various forms, for example, a wave in the form of a pulse wave, a square wave, a saw tooth wave, or the like.

The touch sensor 200 has a plurality of transmission electrodes 201, 202, 203 and receiving electrodes 211, 212, 213. Each of the transmission electrodes 201, 202, 203 and the receiving electrodes 211, 212, 213 are arranged in a crossing form, and capacitance is formed at the crossing points. Also, the transmission electrodes 201, 202, 203 extend in a first direction and are arranged separated with a uniform spacing. Also, the receiving electrodes 211, 212, 213 extend in a second direction substantially perpendicular to the first direction and are arranged separated with a uniform spacing. Transmission signals Tx[1], Tx[2], Tx[3] are respectively applied to each of the transmission electrodes 201, 202, 203, and receiving signals Rx[1], Rx[2], Rx[3] are output from the receiving electrodes 211, 212, 213.

When a touch action by a user occurs, capacitance of the corresponding coordinates is changed. Typically, the amplitude of a receiving signal Rx is reduced due to a changed capacitance. Also, the applied transmission signals Tx may be applied in a scanning method in which adjacent transmission signals have a constant phase difference. Also, the transmission signals Tx are applied with a specific frequency, and substantially the same frequency as the transmission signals Tx occurs in the receiving signals Rx.

Also, when noise having a frequency close to the frequency of a transmission signal Tx due to various reasons is entered, a signal with an increased or a decreased amplitude occurs in the receiving signals Rx. That is, whereas signals Rx has a tendency to converge a specific level when no noise is entered, changes occur in receiving signals Rx when noise is entered.

The receiving processor 300 is input with receiving signals Rx which are converted into digital signals through specific signal processing operations. The receiving signal Rx has a smaller amplitude relative to a transmission signal Tx. This is due to the capacitance component the touch sensor 200, which is an impedance component. The receiving signal Rx with a decreased amplitude relative to a transmission signal Tx is amplified with a specific gain by the receiving processor 300.

Also, the amplified receiving signal is formed in a wave form oscillating between (+) and (−) about the ground level, as in AC. This is again formed into a wave oscillating in the (+) direction or the (−) direction through a calculation operation with the driving signal Drf or the frequency control signal Fctl. For example, the amplified receiving signal may be formed in a saw tooth wave form that oscillates only in the (+) direction. This is called a demodulator output signal.

The demodulator signal is filtered with a low pass filter and converted into a digital code ACD_OUT. The converted digital code ADC_OUT has touch information of the corresponding touch sensor 200.

The optimum frequency generator 400 deduces a noise component from the received digital code ADC_OUT and makes a comparison with a reference value. That is, when a result value of the digital code ADC_OUT is deduced and, as a result, shows a result value equal to or exceeding a specific ratio with respect to the reference value, the optimum frequency generator 400 generates a frequency control signal Fctl for changing frequency. The generated frequency control signal Fctl is applied to the signal generator 500.

The signal generator 500 receives the frequency control signal Fctl and applies, to the driver 100, a driving signal Drf according to the received frequency control signal Fctl. The driving signal Drf is preferably a square wave with a specific frequency due to the frequency control signal Fctl.

In FIG. 1, the optimum frequency generator 400 determines an optimum frequency by storing and analyzing a digital code ADC_OUT input from the receiving processor 300. For example, when a transmission signal Tx having a first frequency is applied to the touch sensor 200 and a receiving signal Rx of the first frequency is output, the receiving signal Rx is converted into a digital code ADC_OUT and delivered to the optimum frequency generator 400.

The optimum frequency generator 400 analyzes a noise component with a frequency close to a receiving signal Rx having a first frequency and makes a comparison with a reference value. That is, noise level information is deduced from the digital code ADC_OUT, and, when the deduced noise level information is equal to or greater than a specific level relative to a reference value, the optimum frequency generator 400 generates a driving signal having a second frequency, which is different from the first frequency, through the frequency control signal Fctl. The above described operation continues until effects due to noise components of the digital code ADC_OUT input to the optimum frequency generator 400 are eliminated. For example, frequency changing operation by the driving signal Drf repeats until noise level information of the digital code ADC_OUT according to the changed frequency exhibits a change that is smaller than a specific level relative to a reference value.

FIG. 2 is a block diagram for explaining operation of a receiving processor according to an exemplary embodiment of the present invention.

Referring to FIG. 2, the receiving processor 300 has an amplifier 310, a demodulator 320, a low pass filter 330, and an analog-digital converter 340.

The amplifier 310 amplifies a receiving signal Rx with a specific gain. The amplified receiving signal has a frequency identical to a transmission signal Tx or a driving signal Drf and has an amplitude that is increased relative to a receiving signal Rx. Also, the amplified receiving signal has a form in which oscillations occur between (+) and (−) with respect to an AC ground.

Proceeding, the amplified receiving signal is input to the demodulator 320. The demodulator 320 is input with a driving signal Drf or a frequency control signal Fctl, as well as the amplified receiving signal. That is, regardless of the applied signal, no operational problem occurs because the driving signal Drf or the frequency control signal applied to the demodulator 320 Fctl mutually has an identical frequency. The applied signals are converted into a signal having a phase in one specific direction through a multiplication operation or a wave form reversal in specific regions. For example, the demodulator 320 may reverse a wave form with a specific phase through a mixer operation. That is, any configuration of the demodulator 320 is possible as long as conversion into a wave form having a phase in a specific direction can be achieved. For example, the output signal from demodulator 320 may be converted into a signal having a phase in the (+) direction.

Output from the demodulator 320 is input to the low pass filter 330. The low pass filter 330 performs a filter operation to remove high frequency components from the demodulator output signal. The filtered signal, which is a filtered demodulator output signal, is input to the analog-digital converter 340.

The analog-digital converter 340 converts the filtered signal into a digital code ADC_OUT using a sampling operation. The converted digital code ADC_OUT includes a noise component and touch information introduced by the touch sensor 200.

Also, in FIG. 2, a band pass filter may be provided between the amplifier and the demodulator, and another band pass filter may be provided between the demodulator and the analog-digital converter. The band pass filter provided is used to remove a noise component included in the receiving signal Rx.

FIG. 3 is a different block diagram for explaining operation of a receiving processor according to an exemplary embodiment of the present invention.

Referring to FIG. 3, the receiving processor has a plurality of receiving paths 351, 352, a multiplexer 341, and an analog-digital converter 340.

Each of the receiving paths 351, 352 is input to the multiplexer 341 and mutually connected in parallel. Also, each of the receiving paths 351, 352 is provided with an amplifier 311, 312, a demodulator 321, 322, and a low pass filter 331, 332.

For example, a first receiving signal Rx[1] is input to the first receiving path 351, and the signal processing shown in FIG. 2 occurs. Also, signal processing of the receiving signals Rx[1], . . . , Rx[n] is carried out to nth receiving signal Rx[n]. Signals passed through a low pass filter 331, 332 in each of the receiving paths 351, 352 are applied to the multiplexer 341.

The multiplexer 341 receives a signal output from each of the receiving paths 351, 352 and selects and outputs a particular signal from them. The output signal is applied to the analog-digital converter 340. The multiplexer may select signals of a plurality of receiving paths and, depending on the number of simultaneously selected signals, analog-digital converters 340 may also be provided correspondingly according to the embodiment form.

Also, a band pass filter may be provided in each receiving path 351, 352 as explained in FIG. 2. For example, the band pass filter may be provided in each receiving path, between the amplifier 311, 312 and the demodulator 321, 322, or between the demodulator 321, 322 and the low pass filter 331, 332.

FIGS. 4 to 6 are circuit diagrams illustrating the band pass filter explained in FIGS. 2 and 3 according to an exemplary embodiment of the present invention.

Referring to FIG. 4, the band pass filter has a Shallen-key topology configuration. The filter has a second order filter characteristic, and frequency characteristic for band passing is determined depending on R, C, R1, and R2 values.

Referring to FIG. 5, the band pass filter has a multiple feedback filter configuration. The multiple feedback filter has a transfer function according to Equation 1 below.

$$\frac{Vout}{Vin} = -\frac{sCR_1R_2R_3}{s^2C^2R_2R_3 + 2sCR_3 + 1} \quad \text{[Equation 1]}$$

As indicated by Equation 1, the transfer function has a second order characteristic, and the filter characteristics are determined by C, R1, R2, and R3 values.

Referring to FIG. 6, the band pass filter may have a Gm-C filter structure. The Gm-C filter has a second order transfer function characteristic according to C1 and C2. Accordingly, the characteristic of the band pass filter may be determined by Rbias, C1, and C2 values.

While FIGS. 4 to 6 explain examples of filters that can be used as band pass filters, various other band pass filters are also usable.

FIGS. 7 to 10 are circuit diagrams illustrating the low pass filter shown in FIGS. 2 and 3 according to an exemplary embodiment of the present invention.

FIG. 7 shows a first order low pass filter, and FIG. 8 shows a Shallen-key filter. It is commonly known that the filter in FIG. 8 may perform as a low pass filter depending on resistor and capacitor values. Also, FIG. 9 shows a multiple feedback filter, and FIG. 10 shows a Gm-C filter. Realization of low pass filter performance by the filters shown in FIGS. 9 and 10 is possible by adjusting resistor and capacitor values.

FIG. 11 is a block diagram for explaining operation of the optimum frequency generator according to an exemplary embodiment of the present invention. Referring to FIG. 11, the optimum frequency generator 400 include a memory 410, a noise calculator 420, a data comparator 430, and a frequency selector 440.

In the memory 410, a digital code ADC_OUT is stored. That is, all data of the touch sensor 200 that make up the touch panel are stored in the memory. The unit by which storage into memory 410 occurs may be a digital code corresponding to a single receiving electrode. That is, all touch information received from the touch sensor 200 is stored in the memory 410.

The noise calculator 420 extracts noise level information associated with touch information in the form of a digital code stored in the memory 410. Typically, when externally applied noise has a frequency close to the frequency of a transmission signal Tx or a receiving signal Rx, level of signal Rx decreases or increases. Also, when there is no noise, the receiving signal Rx is characteristically converged at a certain specific voltage. That is, a component of the receiving signal Rx increased due to noise generates information regarding increased noise level. Information about a noise level calculated by the noise calculator 420 is input to the data comparator 430. The information regarding the noise level may be an average value, a median value, kurtosis, standard deviation, or a maximum value of the digital code ADC_OUT.

An average value of the digital codes ADC_OUT is equal to the total sum of the digital codes ADC_OUT divided by the number of data points, and a median value is a specific digital code value at which half of the values of the digital codes ADC_OUT are equal or large and half of the values of the digital codes ADC_OUT are equal or smaller. Also, kurtosis is the most frequently observed value among the values of the digital code ADC_OUT. Also, a standard deviation value indicates how far the values of the digital code ADC_OUT are from the average, and the maximum value indicates the largest value among the values of the digital code ADC_OUT.

A designer may convert the information regarding a noise level into various forms according to the form of the touch panel and noise condition.

The data comparator 430 compares input noise level information in a digital form with a reference value. The extent of noise infiltration converted to a digital form is compared with a reference value through the data comparison operation. Typically, measured digital code fluctuates by about 10% between a case in which the touch sensor 200 is touched by a human finger and a case when no touch has occurred.

For example, the reference value is set with a value input from the touch sensor 200 corresponding to when no touch has occurred and converted into a digital code or to a digital code of a receiving signal Rx in which no noise is present, and whether there is a change from the reference value in the information of the measured noise level is determined. For example, the amount of change in the digital code due to external noise input when a touch occurs may be measured and determined relative to a digital code measured with no occurrence of a touch. Upper limit of change with respect to the reference value for determination may be variously changed depending on the touch panel condition.

For example, when noise level information is indicated by a standard deviation value, a digital code for which no noise is introduced or no touch action has occurred is set as a reference value. For example, assuming a certain standard deviation value is 5% or more of a reference value, the data comparator 430 determines that noise is distributed in a transmission signal Tx or in a frequency domain near the frequency of the transmission signal Tx. The signal determined by the data comparator 430 is applied to the frequency selector 440. The standard deviation is given by Equation 2 below.

$$K = \sqrt{\frac{1}{m}\sum_{i=1}^{m}(ADC_{avg} - ADC_i)^2} \quad \text{[Equation 2]}$$

In Equation 2, K indicates the standard deviation, m indicates the number of digital codes, ADCavg indicates the average value of the digital codes, and ADCi indicates each corresponding digital code.

However, noise level information may be calculated in various ways according to the present embodiment, and the comparison with a reference value according to the standard deviation is just one example. Also, when comparing with the reference value, it is self-evident to a person in the art that the reference value for determining whether noise is introduced may be variously set.

The frequency selector 440 receives a determination signal from the data comparator 430 and generates a frequency control signal Fctl. The generated frequency control signal Fctl may be any signal as long as it is capable of inducing a frequency that is different from the frequency of a transmission signal Tx corresponding to the measured data. Accordingly, the frequency selector 440 generates a frequency control signal Fctl capable of inducing a change in the frequency of the transmission signal. The generated frequency control signal Fctl is applied to the signal generator 500.

For example, the frequency control signal Fctl may have various wave forms and be a signal having a specific frequency. That is, the frequency selector 440 may choose a frequency in 100 Hz and 10 MHz range by arbitrarily dividing the range for avoiding 60 Hz which is the most important frequency for noise signals.

FIG. 12 is a block diagram illustrating the signal generator and the driver shown in FIG. 11 according to an exemplary embodiment of the present invention.

Referring to FIG. 12, the signal generator 500 has a modulator 551. A frequency control signal Fctl and a wave form signal are applied to the modulator 551. Any form of signal may be used as frequency control signal Fctl as long the signal has a frequency, and the signal has a frequency that is changed by the frequency selector 440. Also, a wave form signal is applied to the modulator 551. The wave form signal decides the form of the driving signal Drf generated at the signal generator 500. For example, the driving signal Drf may be a pulse wave, a square wave, or a saw tooth wave. When the modulator 551 takes on a mixer form and the frequency control Fctl forms a periodic wave through a switch on/off operation, the wave form signal may be a signal set at a specific level, a oscillating signal with a specific frequency, and a signal that repeats a plurality of levels.

The driving signal Drf is formed by the signal generator 500 and applied to the driver 100. The driver 100 may form a transmission signal Tx and include an analog buffer or a digital buffer according to the form of the driving signal Drf. For example, when the driving signal Drf is a sine wave or a saw tooth wave, an analog buffer may be used, and, when the driving signal Drf is a square wave, a digital buffer may be used.

That is, the signal generator 500 generates a driving signal Drf by performing a frequency changing operation according to the received frequency control signal Fctl. The driving signal Drf may be a pulse wave, a square wave, or a saw tooth wave having a changed frequency according to the frequency control signal Fctl.

FIGS. 13 and 14 are timing diagrams for explaining operation of a touch panel device according to an exemplary embodiment of the present invention. Also, FIGS. 13 and 14 show timing diagrams for the touch panel device performing scan driving operation.

Referring to FIG. 13, a transmission signal Tx synchronized with a scan signal Hsync is applied. The transmission signal Tx corresponds to each of the transmission line and is transmitted. That is, in the section in which a scan signal Hsync activates the $k_{th}$ transmission signal Tx[k], $k_{th}$ transmission signal Tx[k] is delivered to the $k_{th}$ transmission line. Also, a transmission signal Tx[k+1] is delivered to the $k+1_{th}$ transmission line sequentially.

When noise is introduced to the touch sensor and the noise has a frequency close to a transmission signal Tx, amplitude of a receiving signal Rx increases. That is, when noise has a frequency that is identical or close to that of a transmission signal Tx, amplitude of a receiving signal Rx increases due to superpositioning of wave forms.

Accordingly, it appears that the amplified receiving signal which is output from the amplifier 310 in FIG. 2 shows a somewhat increased amplitude. Also, the demodulator 320 reverses the (−) output of the amplifier 310 for conversion into the (+) phase.

Then, a filtered signal that passed the low pass filter 340 becomes an output signal at the demodulator 320 with high frequency components removed. The signal through the low pass filter is converted to a digital code ADC_OUT by the analog-digital converter 340 and input to the optimum frequency generator 400 in FIG. 11.

All information of touch sensor 200 constituting the panel is stored in the optimum frequency generator 400, and effects of noise are evaluated through extracting noise level information. Extracted noise level information is compared to a reference value. The reference value corresponds to data with no touch or introduced noise, and a change that has occurred beyond a specific amount relative to the reference value is determined as indicating that the frequency of the noise component is close to the frequency of the transmission signal Tx. Accordingly, the frequency selector 440 of the optimum frequency generator 400 changes the frequency of the driving signal Drf through the frequency control signal Fctl. When the frequency of the driving signal Drf is changed and the difference in frequency between the noise and the transmission signal Tx increases, change in amplitude in the receiving signal Rx due to the noise component is reduced.

The operation described above is repeated until a change between information on the measured noise level and the reference value is equal to or smaller than a specific amount.

Referring to FIG. 14, a transmission signal Tx with a changed frequency is applied. A receiving signal Rx has a frequency that is identical to the frequency of the transmission signal Tx. The receiving signal Rx has a frequency that can offset an applied noise component. Accordingly, almost no noise component is present in the output of the low pass filter, and the noise effect is minimized. Due to the changed frequency, noise level information shows a change within a specific amount relative to a reference value. Through this, disturbance noise effect is minimized.

Also, various methods of changing frequency may be conducted. For example, frequency may be gradually increased by using the frequency control signal Fctl, and, conversely, frequency may be decreased by using the frequency control signal Fctl.

FIGS. 15 and 16 are different timing diagrams for explaining operation of a touch panel device according to an exemplary embodiment of the present invention. Also, FIGS. 15 and 16 show the touch panel device operating in the multi-line selection driving method.

First, referring to FIG. 15, a transmission signal Tx is synchronized to a scan signal Hsync and applied to all transmission lines simultaneously. However, because the transmission signal is applied as a matrix type, a transmission signal applied to each transmission line may have a specific pattern. Also, a plurality of transmission signals are applied to transmission lines simultaneously according to the operating method. In particular, FIGS. 15 and 16 describe transmission signals with no repeating periods. This is because the transmission signal is applied in a specific matrix form. Accordingly, when discussing frequency of a transmission signal, it is assumed that the frequency of the transmission signal is identical to the frequency of the driving signal Drf used to form a transmission signal.

When noise is introduced to a touch sensor and the introduced noise has a frequency close to a transmission signal Tx, amplitude of a receiving signal Rx increases. Compared to a typical case, when noise has a frequency that is identical or close to that of a transmission signal Tx, amplitude of a receiving signal Rx is increased due to superpositioning of wave forms.

All information of the touch sensor 200 constituting a panel is stored in the optimum frequency generator 400, and effects of noise are evaluated through extracting noise level information. Extracted noise level information is compared to a reference value. The reference value corresponds to data with no touch or introduced noise, and a change that has occurred beyond a specific amount relative to the reference value is determined as indicating that the frequency of the noise component is close to the frequency of the transmission signal Tx. Accordingly, the frequency selector 440 of the optimum frequency generator 400 changes the frequency of the driving signal Drf through the frequency control signal Fctl.

The operation described above is repeated until the change of information on the measured noise level from the reference value is equal to or smaller than a specific amount.

Referring to FIG. 16, a transmission signal Tx with a changed frequency is applied. A receiving signal Rx has a frequency that is identical to the frequency of the transmission signal Tx. The receiving signal Rx has a frequency that can offset an applied noise component. Accordingly, almost no noise component is present in the output of the low pass filter, and the noise effect is minimized. Due to the changed frequency, noise level information shows a change within a specific amount relative to a reference value. Through this, disturbance noise effect is minimized.

FIGS. 17 and 18 are still different timing diagrams for explaining operation of a touch panel device according to an exemplary embodiment of the present invention. Also, FIGS. 17 and 18 show the touch panel device operating in the block operation method.

Block operation method groups adjacent transmission electrodes into a block and simultaneously sends a transmission signal thereto. Accordingly, a plurality of blocks are configured, scan driving method is applied between the blocks, and multi-line selection driving method is used for transmission electrodes within a block.

In FIG. 17, $k_{th}$ transmission electrode and $k+1_{th}$ transmission electrode is configured as a block. Accordingly, a receiving signal Tx[k] applied to the $k_{th}$ transmission electrode and a receiving signal Tx[k+1] applied to the $k+1_{th}$ transmission electrode are applied simultaneously. Noise has been introduced to the receiving signal Rx due to a touch.

The optimum frequency generator 400 compares extracted noise level information with a reference value. Through this, the frequency selector 440 of the optimum frequency generator 400 changes the frequency of the driving signal Drf through the frequency control signal Fctl.

FIG. 18 shows transmission signals and receiving signals resulting from a driving signal Drf having a frequency that is changed using signal Fctl with changed frequency control. It is apparent that, due to the driving signal Drf having a changed frequency, noise component in the demodulator output is minimized, and noise component in the low pass filter output is also minimized compared to FIG. 17.

Through the operations described above, effect due to touch sensing is minimized even when noise is introduced. Also, in the present invention described above, driving signal is not supplied in a fixed state and is changed according to the applied noise. Through this, loss of touch signal sensitivity or malfunctions due to noise effect can be prevented, and touch action accuracy can be obtained.

The invention claimed is:

1. A touch panel device, comprising:
   a driver configured to generate a transmission signal for detecting a touch action;
   a touch sensor having mutually crossing transmission electrodes and receiving electrodes and configured to generate a receiving signal according to the touch action;
   a receiving processor configured to convert the receiving signal into a digital code;
   an optimum frequency generator configured to receive the digital code from the receiving processor, extract noise level information from the digital code, determine whether a noise component having a frequency close to a frequency of the transmission signal is included in the receiving signal based on the noise level information, and generate a frequency control signal based on a result of the determining; and
   a signal generator configured to generate a driving signal for changing a frequency of the transmission signal based on the frequency control signal,
   wherein the receiving processor comprises:
   an amplifier configured to amplify the receiving signal to form an amplified receiving signal that has waveform oscillating in (+) and (−) directions about a ground level;
   a demodulator configured to receive the amplified receiving signal and convert the amplified receiving signal into a signal oscillating in only (+) direction about the ground level;
   a low pass filter configured to remove a high frequency component from the output signal of the demodulator such that an amplitude of an output of the low pass filter is changed by the noise component having a frequency close to the frequency of the transmission signal; and
   an analog-digital converter configured to convert the output from the low pass filter to the digital code having the noise level information through digital conversion, and
   wherein the optimum frequency generator comprises,
   a memory configured to store the digital code having the noise level information;
   a noise calculator configured to extract the noise level information from the digital code stored in the memory;
   a data comparator configured to determine whether the receiving signal includes the noise component having a frequency close to the frequency of the transmission signal based on comparison between the noise level information of the digital code and a reference value; and
   a frequency selector configured to generate the frequency control signal such that the frequency of the transmission signal is changed by the frequency control signal based on the receiving signal including the noise component having a frequency close to the frequency of the transmission signal.

2. The touch panel device of claim 1, wherein the reference value is a digital code in a case where no touch action has occurred or no noise has been introduced.

3. The touch panel device of claim 1, wherein the noise level information indicates an average value, a median value, kurtosis, a standard deviation, or a maximum value of the digital code.

4. The touch panel device of claim 3, wherein, when the noise level information of the digital code shows a change larger than a specific reference value, the data comparator determines the frequency of the noise component is close to the frequency of the transmission signal.

5. The touch panel device of claim 1, wherein the driving signal or the frequency control signal is applied to the demodulator.

6. The touch panel device of claim 1, wherein a band pass filter that only passes signals within a specific frequency band is further provided between the amplifier and the demodulator or between the demodulator and the low pass filter.

7. A method of operation for a touch panel device, comprising:

receiving a receiving signal having a first frequency and generated based on a transmission signal for detecting a touch action;

forming a digital code based on the receiving signal;

generating a frequency control signal by determining whether the receiving signal includes a noise component having a frequency close to the frequency of the receiving signal, based on the digital code;

generating a driving signal having a second frequency that is different from the first frequency, according to the frequency control signal; and updating the transmission signal to have the second frequency using the driving signal having the second frequency, wherein the forming the digital code comprises:

amplifying the receiving signal to form an amplified receiving signal oscillating in (+) direction and (−) direction about a ground level;

converting the amplified receiving signal to a signal oscillating in only (+) direction by reversing part of wave form of the amplified receiving signal;

removing a high frequency component from the signal oscillating in only the (+) direction to form a filtered signal with an amplitude that is changed by the noise component having a frequency close to the frequency of the transmission signal; and converting the filtered signal to the digital code having noise level information by performing digital conversion on the filtered signal, wherein the generating of the frequency control signal comprises:

obtaining the noise level information from the stored digital code;

determining whether the receiving signal includes the noise component having a frequency close to the frequency of the transmission signal based on comparison between the noise level information of the digital code and a reference value; and generating the frequency control signal such that the frequency of the transmission signal is changed by the frequency control signal based on the receiving signal including the noise component having a frequency close to the frequency of the transmission signal.

8. The method of claim 7, wherein the reference value is a digital code in a case where no touch action has occurred or no noise has been introduced.

9. The method of claim 7, wherein the frequency control signal has the second frequency when the receiving signal includes the noise component having a frequency close to the frequency of the transmission signal.

10. The method of claim 7, further comprising, prior to receiving the receiving signal, applying a driving signal having the first frequency to form the transmission signal having the first frequency.

11. The method of claim 10, wherein the driving signal having the first frequency is sequentially delivered by a scan driving method.

12. The method of claim 10, wherein the driving signal having the first frequency is simultaneously delivered by a multi-line selection driving method.

13. The method of claim 10, wherein the driving signal having the first frequency is simultaneously delivered to transmission electrodes set in blocks and is sequentially supplied between each of the blocks by a block driving method.

* * * * *